United States Patent Office 2,853,832
Patented Sept. 30, 1958

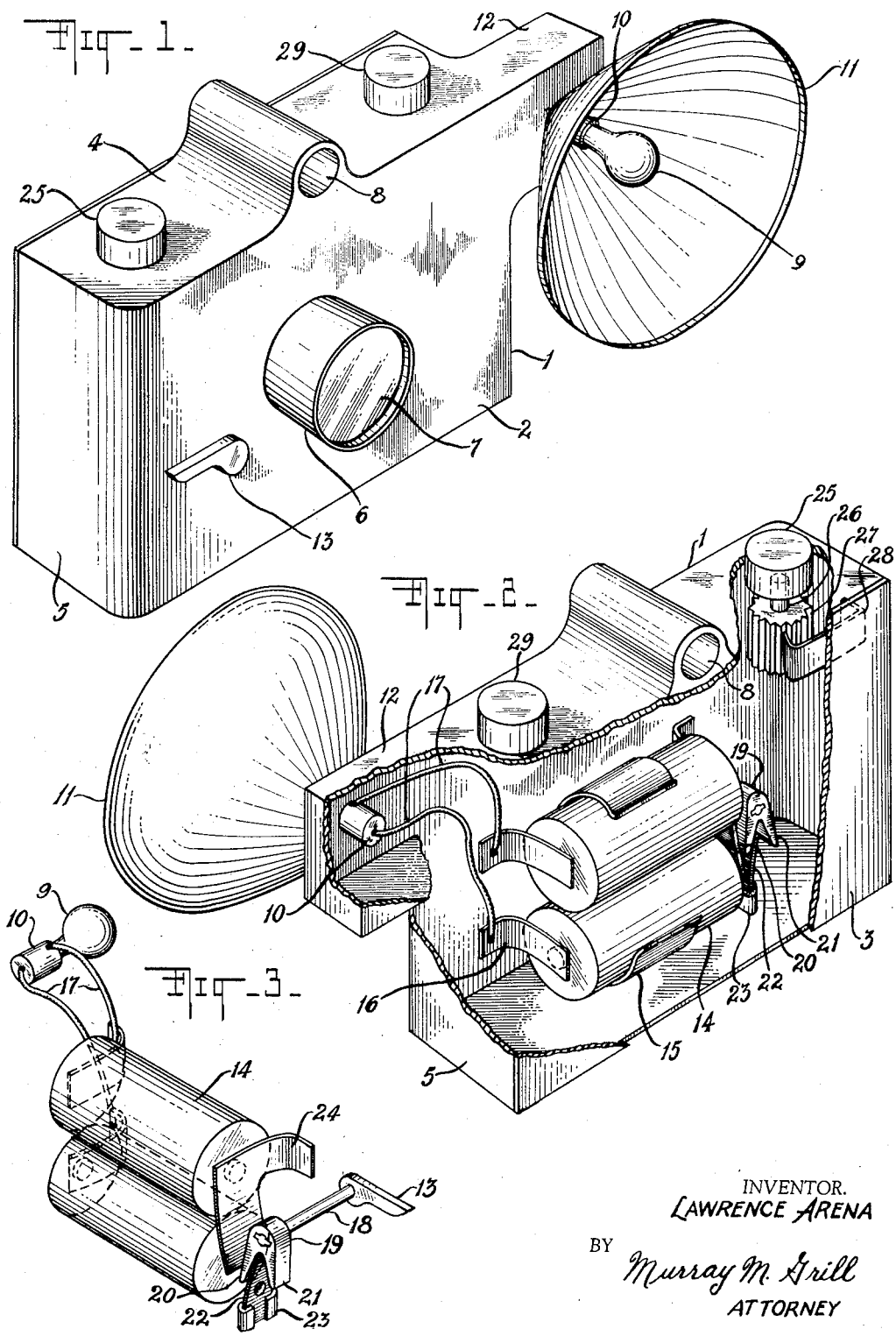
Sept. 30, 1958 — L. ARENA — 2,853,832
TOY FLASH CAMERA
Filed May 13, 1957
INVENTOR.
LAWRENCE ARENA
BY Murray M. Grill
ATTORNEY

2,853,832
TOY FLASH CAMERA
Lawrence Arena, Brooklyn, N. Y.
Application May 13, 1957, Serial No. 658,789
5 Claims. (Cl. 46—228)

The present invention relates to a novel toy flash camera, as hereinafter described and claimed.

Many and varied toy cameras have been known heretofore. The development of a toy camera which would simulate an actual flash camera in outward appearance and in apparent operation by a child but which would be of simple construction, inexpensive, educational and entertaining to the child would be advantageous.

It is a principal object of the present invention to provide a toy flash camera with the above advantages.

It is a further object of this invention to provide a toy camera which superficially resembles an actual flash camera to a child but which is functionally and operatively different therefrom.

Another object of the invention is to provide a toy flash camera having a high degree of educational, amusement and entertainment value for the child.

A further object of this invention is to provide a toy flash camera adapted for easy manipulation and operation by a child with the production of sounds.

A still further object is to provide a toy flash camera of a durable nature and adapted for economical construction.

Other and additional objects and advantages will be manifested from the following description when taken in conjunction with the annexed drawing.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, the preferred embodiments of the various ways in which the principle of the invention may be employed.

Broadly stated, the toy flash camera comprises a camera casing having a flash unit associated therewith, said flash unit comprising a reflector and a socket adapted to retain a flashlight bulb therein, said casing having within its confines means for supplying electrical current to said flash unit and energizing said flashlight bulb, said casing having on its exterior surface an actuating means connected to said current source for simultaneously completing the electrical circuit and illuminating said flashlight bulb and for producing noise, a projection on the front end of said casing simulating a lens housing, a rotatable means for producing noise, and a viewing means associated with said casing. More particularly, the invention comprises a box including a front, rear, bottom, top and side walls; said flash unit mounted thereon, a battery within said box and operatively connected to said flash unit, and an actuator mounted on the exterior of said box and operatively connected to a bifurcated lever pivotally mounted within said box, said inner lever adapted to act resiliently to simultaneously operate a means for producing noise and to close the electrical circuit and light the flashlight bulb; said front wall having disposed thereon a cylindrical projection terminating in a facing simulating a lens, said top wall having disposed thereon a knob rotatably engaging a ratchet wheel within said box for producing noise, and a transparent viewing screen situated on the upper portion of said box.

The present invention is illustrated, by way of example, in the accompanying drawing in which:

Figure 1 is a perspective front view of a toy flash camera embodying the invention.

Figure 2 is a perspective rear view with the rear wall fractionally removed to disclose the interior structure of the toy flash camera.

Figure 3 is a detailed view of the operating lever, the clicker and the units of the electrical circuit.

Referring now to the drawing in detail, particularly Figure 1, the illustrative and preferred embodiment of the present invention comprises a box-like structure 1, including a front wall 2, a rear wall 3, a top wall 4, a bottom wall (not shown), and side walls 5. The box 1 or casing may be made of any suitable material such as wood, fiberboard, metal or plastic. It is preferred to employ a rigid plastic material due to its relatively low cost and ease with which it can be molded into an attractive construction. Protruding from the front wall 2 is a cylindrical projection 6 to simulate a lens housing and which terminates in a facing 7 to simulate a lens of an actual camera. The facing 7 is preferably a clear or colored plastic (including cellulosic) film, sheet or disc attached therein or it may be an integral part of the projection 6 and made of plastic, wood or the like.

A viewing screen 8 is situated on the top wall 4 to enable the child to imitate an adult in sighting the object to be photographed. This viewing means may be disposed at the upper portion of the box 1 in any desired fashion and may extend the full depth of the top wall 4 as illustrated or only partially, such as in the attachment of a transparent tab or the like. The viewer screen may be an uncovered orifice, but if desired it may be covered by a clear transparent plastic material.

Associated with the box 1 and situated on side wall 5 is the flash unit comprising a flashlight bulb 9 inserted or retained in a socket 10 adapted to receive same and immediately behind is mounted a reflector 11 used in conjunction with the flashlight bulb 9 for reflecting the light emanating therefrom. Any suitable flashlight bulb of small voltage may be employed and it has been found that a bulb having approximately four volts yields a flash of sufficient magnitude to attract and hold the child's interest. The reflector 11 may be constructed out of any suitable material such as aluminum, tin, a silvered or opaque plastic material or the like. It is preferred that the reflector 11 be composed of at least in part an opaque translucent material permitting some illumination through the back such that the child will see the flash while holding and operating the toy camera in front of him. Projecting from the sidewall 5 is an extension 12 serving as the holder and means of attachment of the flash unit to the box. This holder 12 is preferably a continuation of box 1 as illustrated for convenience in construction. Alternatively, the holder 12 may be situated on the top wall if desired. The flash unit may be attached to the box 1 by any other connecting means if desired, such as by screws or plugs. For example, a suitable attachment is the engagement of male plugs attached to the flash unit with female plugs situated on the sidewall 5, said means of attachment being well known.

The lever 13 is positioned on the front wall 2 and is the primary actuating means for simultaneously producing noise and for energizing the flashlight bulb 9 by completion of the electrical circuit through a battery 14 within the box 1, the arrangement of the elements therein being shown in Figure 2. The electrical battery 14 comprises a pair of suitable flashlight batteries of the conventional dry cell type commonly used in flash lights. The box 1 is provided with metal clips or holder 15 for maintaining the batteries in place though other holding means may be employed such as the use of a suitable depression or receptacle in the body or walls of the box. Metal contacts 16 are in contact with the battery 14 and with wire leads 17 or similar conductor to the socket 10 enabling transmission of the electric current from the current source to the flashlight bulb 9.

Referring to Figure 3 particularly, the lever 13 is connected by means of shaft 18 to a bifurcated or inverted V-shaped cam or lever 19 which is pivotally mounted on said shaft 18. The lever 19 is constructed of any suitable material, preferably a non-conductive material such as plastic. The lever 19 has an inner prong 20 and an outer prong 21. Between said prongs, there is positioned a resilient metal strip 22 adapted to produce a clicking sound. This clicker 22 is mounted in a stationary holder 23 which is affixed to the bottom wall of the box 1. The function of the clicker or spring metal strip 22 is to produce a clicking sound when depressed or flexed by contact with the outer prong and when released to return to its normal position. This metal strip 22 should have preferably a slight depression in the center in order to accentuate tension in one direction so that, when it is depressed or flexed in the opposite direction, it produces a sharp click. When outer prong 21 engages the clicker 22, then inner prong 20 simultaneously depresses the lower portion of metal contact strip or switch member 24 so as to contact the battery 14 and complete the electrical circuit.

In operation, the child will sight an object through the viewer 8 and then depresses the external lever 13. The latter operation brings the inner prong 20 into resilient engagement with the metal contact strip 24 thereby closing the electrical circuit and illuminating the flashlight bulb. Simultaneously therewith, the outer prong 21 flexes the spring metal strip 22 producing a clicking sound and thereby simulating the photographing of the object in synchronization with the flash from the bulb 9. The bulb remains illuminated as long as the lever 13 remains depressed. Upon release of said lever, the bifurcated lever 19 returns to its normal resting position and is disengaged from contact 24 thereby interrupting the electrical circuit and darkening the bulb 9. The spring metal strip 22 is released also thereby producing a clicking sound as it returns to its original position. The child may then repeat the operation as desired.

For purposes of illustration, the actuator 13 has been shown as a lever element but it is apparent that it can be in the form of a push button or other suitable shape or form on the front or top wall and operatively connected with the bifurcated lever 19.

A further element of the present invention is a knob 25 situated on the top wall 4 and adapted to produce a noise. As illustrated in Figure 2, the knob 25 is connected by means of a shaft 26 to a ratchet wheel 27, said ratchet wheel being situated within the confines of box 1. The spring metal strip 28 has one end fixedly attached to the side wall and the other end is free to engage the grooves of the ratchet wheel 27 as knob 25 is rotated, thereby creating noise. The operation of knob 25 will simulate to a child the winding of film in an actual camera.

The knob 29 is positioned adjacent to the opposite end of the top wall 4. The outward appearance is generally similar to knob 25 but it is preferably stationary. If desired, it can be made movable so as to rotate and produce noise in the same manner. It functions in the toy flash camera as a contributing element to the combination since it simulates for a child the outward appearance of many well known actual cameras.

The rear wall 3 of box 1 should be sufficiently removable to permit the replacement of the batteries in the box. The rear wall may be hinged at one end, or snap on or slide in and out from the box as desired.

Thus, it is apparent that this invention provides a simple, compact and desirable toy camera which superficially resembles a toy camera in outward appearance and to the extent that it is operated by a child but which is diverse in inherent operation and function. It results in synchronization of a clicking sound and illumination of a flashlight bulb, and a further sound-producing means to simulate the winding of film on a reel, a viewing screen, etc.

The advantages of the present toy flash camera over conventional toy cameras which do not possess such features are obvious. The similarity to a child of the present toy flash camera to an actual one provides a definite educational value as well as amusement. It provides for a grown-up feeling in the small child who feels that he has a camera like an adult. At the same time, the child is taught the operation of an actual camera. Accordingly, the parent-child relationship is enhanced by virtue of a similarity in interests. It provides also for the development of a useful, educational and amusing hobby for the child.

While the invention has been described with reference to various embodiments thereof as hereinbefore set forth, it is to be clearly understood that the invention is not limited thereto, but includes various modifications and equiavlents within the scope of the instant invention.

Having thus described my invention, what is desired to be secured by Letters Patent is:

1. A toy flash camera comprising a camera casing having a flash unit associated therewith, said flash unit comprising a reflector and a socket adapted to retain a flashlight bulb therein, said casing having within its confines means for supplying electrical current to said flash unit and energizing said flashlight bulb, and having a fixture for producing a clicking noise to simulate the shutter action of a camera mounted therein, said casing having on its exterior surface a manually operated actuating means connected to said current source for completing the electrical circuit and illuminating said flashlight bulb, said actuating means operatively engaging said fixture to produce a clicking noise simultaneously with illumination of said bulb; a projetcion on the front end of said casing simulating a lens housing, a rotatable fixture disposed on the exterior surface and operatively engaging a means for producing noise to simulate the winding of film in a camera, and a direct vision viewing means associated with said casing.

2. A toy flash camera in accordance with claim 1 wherein said actuating means includes a lever positioned on the front of said casing and operatively engaging said first-named fixture which produces a clicking noise and which completes the electrical circuit and illuminates said flashlight bulb.

3. A toy flash camera in accordance with claim 2 which includes a knob on said casing rotatably engaged to a ratchet wheel within said casing.

4. A toy flash camera comprising a box including a front, rear, bottom, top and side walls; a flash unit mounted on said box comprising a reflector and a socket adapted to retain a flashlight bulb therein, a battery within said box and operatively connected to said flash unit, a lever mounted on the front exterior of said box and operatively connected to a bifurcated lever pivotally mounted within said box, said inner bifurcated lever adapted to simultaneously contact a clicker and a metal contact so as to complete the electrical circuit; said front wall of said box having disposed thereon a cylindrical projection terminating in a facing, a rotatable knob positioned on said top wall and adjacent to a side wall, said knob operatively engaging a ratchet wheel within said box, and a direct vision viewer situated on the upper portion of said box.

5. A toy camera in accordance with claim 4 having a second knob on the top wall and adjacent to the side wall opposite from said rotatable knob.

References Cited in the file of this patent

UNITED STATES PATENTS

| | | |
|---|---|---|
| 1,764,982 | Reich et al. | June 17, 1930 |
| 2,783,696 | Sewig | Mar. 5, 1957 |